US012562386B2

(12) United States Patent
An et al.

(10) Patent No.: US 12,562,386 B2
(45) Date of Patent: Feb. 24, 2026

(54) METHOD FOR PRODUCING NEGATIVE ELECTRODE ACTIVE MATERIAL FOR LITHIUM SECONDARY BATTERY

(71) Applicants: POSCO HOLDINGS INC., Seoul (KR); RESEARCH INSTITUTE OF INDUSTRIAL SCIENCE & TECHNOLOGY, Pohang-si (KR); POSCO FUTURE M CO., LTD., Pohang-si (KR)

(72) Inventors: Jung-Chul An, Pohang-si (KR); Sei Min Park, Pohang-si (KR); Gang Ho Lee, Pohang-si (KR); Moonkyu Cho, Pohang-si (KR); Byoung Ju Kim, Pohang-si (KR); Jong Hoon Yoon, Pohang-si (KR); Hyun-Chul Jo, Pohang-si (KR)

(73) Assignees: POSCO Holdings Inc., Seoul (KR); Research Institute of Industrial Science & Technology, Pohang-si (KR); POSCO Future M Co., Ltd., Pohang-si (KR)

( * ) Notice: Subject to any disclaimer, the term of this patent is extended or adjusted under 35 U.S.C. 154(b) by 954 days.

(21) Appl. No.: 17/415,848

(22) PCT Filed: Dec. 6, 2019

(86) PCT No.: PCT/KR2019/017223
§ 371 (c)(1),
(2) Date: Jun. 18, 2021

(87) PCT Pub. No.: WO2020/130443
PCT Pub. Date: Jun. 25, 2020

(65) Prior Publication Data
US 2022/0077466 A1    Mar. 10, 2022

(30) Foreign Application Priority Data

Dec. 19, 2018    (KR) ........................ 10-2018-0165639
Dec. 19, 2018    (KR) ........................ 10-2018-0165645

(51) Int. Cl.
H01M 4/587    (2010.01)
C01B 32/205    (2017.01)
(Continued)

(52) U.S. Cl.
CPC ........... H01M 4/587 (2013.01); C01B 32/205 (2017.08); C01B 32/21 (2017.08);
(Continued)

(58) Field of Classification Search
None
See application file for complete search history.

(56) References Cited

U.S. PATENT DOCUMENTS 6,139,990 A * 10/2000 Kubota ................. H01M 4/583
423/460
6,803,150 B1    10/2004 Iriyama et al.
(Continued)

FOREIGN PATENT DOCUMENTS

CN    1331253 C    8/2007
CN    102362381 A    2/2012
(Continued)

OTHER PUBLICATIONS

International Search Report and Written Opinion issued in corresponding International Application No. PCT/KR2019/017223 dated Apr. 2, 2020, with English translation.
(Continued)

*Primary Examiner* — Jonathan G Leong
*Assistant Examiner* — Claire A Rutiser
(74) *Attorney, Agent, or Firm* — Morgan Lewis & Bockius LLP

(57) ABSTRACT

The present invention relates to a negative electrode active material of a lithium secondary battery, a manufacturing method thereof, and a lithium secondary battery using the same. An embodiment of the present invention provides a negative electrode active material for a lithium secondary battery, including a graphite material including secondary particles, wherein the secondary particles are an assembly of a plurality of primary particles, the primary particles include
(Continued)

green coke, and a ratio ((D90–D10)/D50) of a difference between a particle diameter D90 and a particle diameter D10 with respect to a particle diameter D50 of the secondary particles is 1.0 to 1.32. An embodiment of the present invention provides a method for manufacturing a negative electrode active material for a lithium secondary battery, including: manufacturing primary particles by using a carbon raw material including green coke; manufacturing secondary particles by mixing the primary particles and a binder; carbonizing the secondary particles; and manufacturing a graphite material by graphitizing the carbonized secondary particles, wherein a particle diameter D50 of the primary particles is 5.5 to 10.0 μm.

7 Claims, 6 Drawing Sheets

(51) Int. Cl.
   *C01B 32/21*        (2017.01)
   *H01M 4/02*        (2006.01)
   *H01M 10/0525*        (2010.01)

(52) U.S. Cl.
   CPC ..... *H01M 10/0525* (2013.01); *C01P 2004/32* (2013.01); *C01P 2004/61* (2013.01); *C01P 2006/11* (2013.01); *C01P 2006/12* (2013.01); *C01P 2006/40* (2013.01); *H01M 2004/021* (2013.01); *H01M 2004/027* (2013.01)

(56)        References Cited

U.S. PATENT DOCUMENTS

| | | | | |
|---|---|---|---|---|
| 2008/0090148 | A1* | 4/2008 | Mao | C04B 35/6264 |
| | | | | 429/209 |
| 2009/0214954 | A1* | 8/2009 | Onishi | H01M 4/0435 |
| | | | | 429/231.8 |
| 2009/0242849 | A1* | 10/2009 | Sudoh | C01B 32/205 |
| | | | | 252/502 |
| 2016/0322636 | A1 | 11/2016 | Lee et al. | |
| 2017/0200939 | A1* | 7/2017 | Murphy | H01M 4/622 |
| 2019/0097271 | A1* | 3/2019 | Wang | H01M 4/667 |
| 2019/0348667 | A1* | 11/2019 | Kang | H01M 4/133 |

FOREIGN PATENT DOCUMENTS

| | | |
|---|---|---|
| CN | 103794790 A | 5/2014 |
| CN | 102117911 B | 6/2014 |
| CN | 104756292 A | 7/2015 |
| CN | 105024043 A | 11/2015 |
| CN | 105024075 A | 11/2015 |
| CN | 103682347 C | 2/2016 |
| CN | 105742636 A | 7/2016 |
| CN | 103311520 B | 9/2016 |
| CN | 107078288 A | 8/2017 |
| CN | 107579252 A | 1/2018 |
| CN | 107851795 A | 3/2018 |
| CN | 105731427 C | 9/2018 |
| EP | 2685535 A1 | 1/2014 |
| JP | 2004-127913 A | 4/2004 |
| JP | 2004-214192 A | 7/2004 |
| JP | 2007-141830 A | 6/2007 |
| JP | WO2006/025376 A1 | 5/2008 |
| JP | 2017-050184 A | 3/2017 |
| JP | WO2018/198377 A1 | 3/2020 |
| KR | 10-0392034 B1 | 7/2003 |
| KR | 10-2004-0012713 A | 2/2004 |
| KR | 10-2008-0087823 A | 10/2008 |
| KR | 10-2012-0123593 A | 11/2012 |
| KR | 10-1249349 B1 | 4/2013 |
| KR | 10-2013-0094853 A | 8/2013 |
| KR | 10-1384216 B1 | 4/2014 |
| KR | 10-1417588 B1 | 7/2014 |
| KR | 10-1484432 B1 | 1/2015 |
| KR | 10-2015-0065773 A | 6/2015 |
| KR | 10-2015-0074295 A | 7/2015 |
| KR | 10-2015-0075218 A | 7/2015 |
| KR | 10-2015-0107674 A | 9/2015 |
| KR | 10-1564374 B1 | 10/2015 |
| KR | 10-2016-0018174 A | 2/2016 |
| KR | 10-1661050 B1 | 9/2016 |
| KR | 10-2018-0051083 A | 5/2018 |
| KR | 10-2018-0101896 A | 9/2018 |
| KR | 10-2018-0133749 A | 12/2018 |
| KR | 10-2019-0019430 A | 2/2019 |
| KR | 10-2019-0054045 A | 5/2019 |
| KR | 10-2019-0076780 A | 7/2019 |
| KR | 10-2019-0143620 A | 12/2019 |
| KR | 10-2019-0143621 A | 12/2019 |
| KR | 10-2020-0036429 A | 4/2020 |
| KR | 10-2020-0076498 A | 6/2020 |
| KR | 10-2020-0076504 A | 6/2020 |
| WO | 2007-072858 A1 | 6/2007 |
| WO | 2010-100764 A1 | 9/2010 |
| WO | 2014-119776 A1 | 8/2014 |
| WO | 2016-018023 A1 | 2/2016 |
| WO | 2016-121711 A1 | 8/2016 |
| WO | 2014-119960 A1 | 8/2017 |
| WO | 2019-035580 A1 | 2/2019 |

OTHER PUBLICATIONS

Extended European Search Report dated Jan. 26, 2022 issued in European Patent Application No. 19900603.2.
Chinese Office Action dated Feb. 18, 2023 issued in Chinese Patent Application No. 201980085030.8.
Japanese Office Action dated Feb. 7, 2023 issued in Japanese Patent Application No. 2021-535986.
H. Zhao, et al., "Effect of Graphite Additives on ElectroChemical Performance of Mesocarbon Microbeads," Carbon, Jan. 18, 2005, 1001-8948(2005)02-0030-05, pp. 30-34.
Z. Shi, et al., "Powder technologies for processing electrode materials of Li-ion Battery," Battery Bimonthly, vol. 34, No. 2, Apr. 2004, pp. 129-131.

* cited by examiner

| | |
|---|---|
| Manufacture primary particles by pulverizing carbon raw material | —S10 |
| Manufacture secondary particles by mixing primary particles and binder | —S20 |
| Manufacture graphite material by graphitizing secondary particles | —S30 |

METHOD FOR PRODUCING NEGATIVE ELECTRODE ACTIVE MATERIAL FOR LITHIUM SECONDARY BATTERY

CROSS REFERENCE

This application is the U.S. National Phase under 35 U.S.C. § 371 of International Application No. PCT/KR2019/017223 filed on Dec. 6, 2019, which claims the benefit of Korean Application Nos. 10-2018-0165639 and 10-2018-0165645 both filed on Dec. 19, 2018, wherein the entire contents of each are hereby incorporated by reference.

TECHNICAL FIELD

The present disclosure relates to a method for manufacturing a negative electrode active material for a lithium secondary battery.

BACKGROUND ART

Recently, batteries have acquired high capacity because of an increase of power consumption caused by high performance and function integration of portable electronic devices such as cellular phones or tablet PCs, and particularly, as high-output power for hybrid electric vehicles (HEV) or electric vehicles (EV), and the necessity of secondary batteries having high-output characteristics with an excellent charging and discharging speed is substantially increasing. Further, as the usage time increases, a period of charging and discharging the battery reduces, so a substantial improvement of the cycle lifespan of the battery is needed, and minimization of the volume change (expansion and contraction) of the battery caused by deterioration of the battery material is gaining attention as a major necessary characteristic. Lithium secondary batteries are widely used because of merits of a high energy density and a high voltage from among the secondary batteries, and commercial lithium secondary batteries generally adopt a metal oxide-based cathode active material and a carbon-based negative electrode active material such as graphite.

The graphite that is a negative electrode active material is classified into natural graphite processed by mining the same from a mine and undergoing physical selection and high purification, and synthetic graphite acquired by processing coke and treating the coke at a high temperature, the coke being a carbon solid that is obtained by performing a heat treatment on organic materials such as coal or petroleum residues.

In general, coal or petroleum-based residues, or pitches that are processed goods, are produced by a carbonization and high-temperature heat treatment (or graphitization) process so as to produce a synthetic graphite negative electrode material. A composite negative electrode material in a mixed form of natural graphite and synthetic graphite may be used so as to supplement the drawbacks of both the materials depending on application goals.

In general, to produce a high-capacity synthetic graphite material, a graphitizing degree is increased by maintaining the graphitizing heat treatment at 2800-3000° C. or more, or a heat treatment is performed by adding a catalyst material so as to induce a catalyst graphitizing reaction. To improve charging and discharging efficiency, a method for minimizing exposure of a graphite edge on the surface of particles by coating a synthetic graphite surface or grinding particles, and suppressing excessive formation of a passivated film produced by decomposition of an electrolyte solution, may also be used.

To improve high-speed charging and discharging performance, alignment of the graphite particles in the synthetic graphite processed goods may be irregularly controlled, or a carbonaceous coating may be applied to the surface of particles. To reduce the change of the material and the electrode volume of synthetic graphite according to charging and discharging, a method for allowing the alignment of graphite particles in the synthetic graphite processed goods to be irregular, or improving numerical stability in a charging and discharging reaction by increasing strength of the material, is also used.

In addition to be above-noted cases, various technical developments are in progress for improving performance of a battery material of synthetic graphite, but in general, trade-off relationships exist among performance, so when specific performance is improved, other performance is deteriorated. For example, when a diffusion distance of lithium ions is reduced by reducing the size of particles of synthetic graphite, the high-speed charging and discharging characteristic may be improved but the lifespan of the battery also reduces by the increase of a specific surface area induced from the small particle size.

In addition, when a negative electrode material in a secondary particle form having condensed the particles with a small diameter and combined the same is formed so as to suppress the change of the material and the electrode volume generated during the charging and discharging, the material volume change caused by the charging and discharging is offset by the primary particles having irregular alignment in the secondary particles, and the total electrode volume change reduces as a merit. However, side effects that irregular alignment of the particles is insufficient according to a processing form of unit primary particles or a secondary particle processing condition, the specific surface area increases or the secondary particle shape is not even, reduction of an expansion rate of the material and the electrode according to the charging and discharging is insufficient, and the lifespan of the battery reduces, may be generated.

DISCLOSURE

The present invention has been made in an effort to provide a method for manufacturing a negative electrode active material for a lithium secondary battery for controlling a coke material and a particle diameter of the coke material.

An embodiment of the present invention provides a negative electrode active material for a lithium secondary battery, including a graphite material including secondary particles, wherein the secondary particles are an assembly of a plurality of primary particles, the primary particles include green coke, and a ratio $((D90-D10)/D50)$ of a difference between a particle diameter D90 and a particle diameter D10 with respect to a particle diameter D50 of the secondary particles is 1.0 to 1.32.

A span value that is the ratio $((D90-D10)/D50)$ of a difference between a particle diameter D90 and a particle diameter D10 with respect to a particle diameter D50 of the secondary particles may be 1.0 to 1.2.

Sphericity of the secondary particles is 0.8 to 1.0.

The particle diameter D50 of the secondary particles may be 11 to 25 μm.

A specific surface area (BET) of the graphite material may be 0.6 to 2.0 $m^2/g$.

Tap density of the graphite material may be 0.8 g/cc to 1.2 g/cc.

The graphite material may satisfy Equation 1.

$$\text{Specific surface area [m}^2\text{/g]/tap density [g/cc]<2} \qquad \text{[Equation 1]}$$

Another embodiment of the present invention provides a method for manufacturing a negative electrode active material for a lithium secondary battery, including: manufacturing primary particles by using a carbon raw material including green coke; manufacturing secondary particles by mixing the primary particles and a binder; carbonizing the secondary particles; and manufacturing a graphite material by graphitizing the carbonized secondary particles, wherein a particle diameter D50 of the primary particles is 5.5 to 10.0 µm.

The primary particles may be a mixture of 5.5 to 8.0 µm elementary particles and large particles that are greater than 8.0 µm and equal to or less than 10.0 µm.

Another embodiment of the present invention provides a method for manufacturing a negative electrode active material for a lithium secondary battery, including: manufacturing primary particles by using a carbon raw material including green coke; manufacturing secondary particles by mixing the primary particles and a binder; carbonizing the secondary particles; and manufacturing a graphite material by graphitizing the carbonized secondary particles, wherein a ratio ((D90–D10)/D50) of a difference between a particle diameter D90 and a particle diameter D10 with respect to a particle diameter D50 of the secondary particles is 1.0 to 1.32.

The carbonizing of secondary particles may further include grinding the carbonized secondary particles.

After the grinding of carbonized secondary particles, a span value that is the ratio ((D90–D10)/D50) of a difference between a particle diameter D90 and a particle diameter D10 with respect to a particle diameter D50 of the secondary particles may be 1.0 to 1.2.

After the grinding of the carbonized secondary particle, sphericity of the secondary particles may be 0.9 to 1.0.

In the manufacturing of primary particles using a carbon raw material including the green coke, the green coke may include a needle coke, an isotropic coke, a pitch coke, and a combination thereof.

The manufacturing of primary particles using a carbon raw material including the green coke may include pulverizing and grinding the carbon raw material.

In the manufacturing of secondary particles by mixing the primary particles and a binder, for 100 parts by weight of the primary particles, the binder may be included at 2 to 20 parts by weight.

The green coke may include 4 to 10 wt % of a volatile matter for an entire 100 wt %.

Another embodiment of the present invention provides a lithium secondary battery including: a positive electrode; a negative electrode including a negative electrode active material for a lithium secondary battery of any embodiment described above; and an electrolyte.

According to the embodiment of the present invention, the negative electrode active material using a green coke controlling a particle diameter may be provided. Therefore, the discharging capacity and the charging and discharging efficiency of the secondary battery according to the negative electrode active material may be excellent. Particularly, the high-speed discharging and charging output characteristic may be improved.

4

MODE FOR INVENTION

Figure 1:
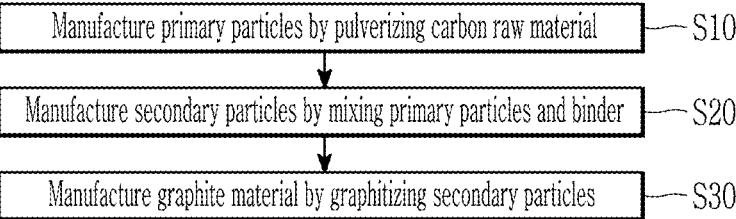
FIG. 1 shows a flowchart of a method for manufacturing a negative electrode active material for a lithium secondary battery according to an embodiment of the present invention.

These advantages and features, and methods of achieving the same of the present invention, will become apparent and more readily appreciated from the following description of the embodiments in conjunction with the accompanying drawings. However, the present invention is not limited to embodiments to be disclosed below, and may be implemented in various forms. It will be appreciated by those skilled in the art that changes may be made to these embodiments without departing from the principles and spirit of the general inventive concept, the scope of which is defined in the appended claims and their equivalents. Like reference numerals designate like elements throughout the specification.

Accordingly, in various embodiments, well-known techniques are not explained in detail to avoid ambiguous interpretation of the present invention. Although not specifically defined, all of the terms including the technical and scientific terms used herein have meanings understood by ordinary persons skilled in the art. Unless explicitly described to the contrary, the word "comprise" and variations such as "comprises" or "comprising" will be understood to imply the inclusion of stated elements but not the exclusion of any other elements. The terms of a singular form may include plural forms unless referred to the contrary.

Negative Electrode Active Material for Lithium Secondary Battery

A negative electrode active material for a lithium secondary battery that is an example of the present invention is a graphite material including secondary particles, the secondary particles are generated by assembling a plurality of primary particles, the primary particles include green coke, and a ratio ((D90–D10)/D50) of a difference between a particle diameter of D90 and a particle diameter of D10 with respect to the particle diameter of D50 of the secondary particles may be 1.0 to 1.32.

In detail, in the present specification, the "secondary particles" may be a plurality of primary particles that are cohered, and are graphitized and assembled in a manufacturing method to be described.

In the present specification, the "green coke (or raw coke)" generally signifies manufacturing coal, petroleum residues, or pitches through a caulking reaction in a high-pressure and high-temperature condition. In detail, an anisotropic or needle coke with high carbonaceous tissue alignment in a one-axis direction is obtained or isotropic or pitch coke with low carbonaceous tissue alignment is obtained according to the raw material composition and the caulking process condition. In further detail, green represents a state obtained after the caulking process, and it signifies a state not undergoing a heat treatment such as calcination or carbonization and thereby including a predetermined rate of volatile matter.

In detail, the green coke may include a needle coke, an isotropic coke, a pitch coke, and a combination thereof.

In detail, when the green coke is used, the negative electrode active material for a lithium secondary battery with a low expansion rate and an excellent high-speed charging and discharging characteristic.

Further, when the green coke is used, an additional heat treatment process for removing a volatile matter is not performed like the calcined coke so price competitiveness may be excellent.

Also, the ((D90−D10)/D50) of the difference between the particle diameter of D90 and the particle diameter of D10 with respect to the particle diameter of D50 of the secondary particle may be 1.0 to 1.32.

In detail, it may be 1.0 to 1.2.

In this instance, the ratio ((D90−D10)/D50) of the difference between the particle diameter of D90 and the particle diameter of D10 with respect to the particle diameter of D50 may signify a span value.

In detail, the "span" value signifies a value obtained by using the calculation equation of (D90−D10)/D50 by use of D10, D50, and D90 that are indexes for representing particle sizes.

In further detail, the particle diameters D10, D50, and D90 represent particle sizes when the active material particles distributed in various particle sizes are accumulated with a volumetric ratio of up to 10%, 50%, and 90%.

Hence, when the span value of the graphite material is very small, a production yield may be substantially reduced and a cost may be increased so as to process powder with a very small deviation of grain sizes in an industrial point of view. Further, a problem in which porosity between powders is relatively low so wetness of an electrolyte is reduced and ion conductivity in the electrode is reduced, and a problem in which it is difficult to configure the electrode with high tap density, may be generated.

Meanwhile, when the span value is very big, the entire specific surface area caused by fine powder increases to reduce the initial charging and discharging efficiency, and viscosity of a slurry for coating the electrode substantially increases, so it may be difficult to manufacture the electrode with uniform quality.

Therefore, the span value of the secondary particle of the negative electrode active material for a lithium secondary battery according to an embodiment of the present invention may be within the above-described range.

To be described in a later portion of the specification, the span value is controlled to be 1.0 to 1.32, thereby controlling the deviation of the grain sizes of the secondary particle.

The particle diameter of D50 of the secondary particle may be 11 to 25 μm. In detail, the particle diameter of D50 of the secondary particle may be 12 to 20 μm, and in detail, it may be 15 to 18 μm.

The secondary particles may have a shape of a powder generated by condensing the primary particles through a heating and mixing process.

In detail, when the secondary particle size D50 is less than 11 μm, the number of the primary particles provided to the secondary particles is very much less, a randomized orientation among particles on an electrode layer is insufficient, and an electrode expansion rate according to a repetition of the charging and discharging reaction may increase. Further, the specific surface area of the negative electrode powder may be increased and battery efficiency may be reduced.

On the other hand, when it is greater than 25 μm, tap density is substantially lowered, formation of a flat electrode surface is scarcely achieved after it is rolled, and realization of appropriate electrode density is difficult to be obtained, so it is difficult to form the secondary battery electrode for expressing excellent battery performance.

The specific surface area (BET) of the graphite material may be 0.6 to 2.0 m$^2$/g. In detail, the specific surface area (BET) of the graphite material may be 0.95 to 1.88 m$^2$/g, and in further detail, it may be 1.3 to 1.65 m$^2$/g.

Sphericity of the secondary particle may be 0.8 to 1.0. In detail, it may be 0.9 to 1.0.

The more the sphericity of the secondary particle approaches 1, the higher the tap density of the graphite material negative electrode active material including the same may be.

Accordingly, the tap density of the graphite material may be 0.8 g/cc to 1.2 g/cc.

In detail, it may be 0.83 g/cc to 1.2 g/cc.

The graphite material may satisfy Equation 1.

$$\text{Specific surface area } [\text{m}^2/\text{g}]/\text{tap density } [\text{g/cc}] < 2 \qquad \text{[Equation 1]}$$

In detail, the specific surface area value for the tap density may be less than 2.

In further detail, in the case of the negative electrode active material including a graphite material, the specific surface area is small, and the bigger the tap density is, the better the battery characteristic may be when applied to the lithium secondary battery.

Accordingly, the less the value according to Equation 1 is, the better the battery characteristic may be. Hence, regarding the negative electrode active material for a lithium secondary battery according to an embodiment of the present invention, the value according to Equation 1 may be less than 2.

Method for Manufacturing Negative Electrode Active Material for Lithium Secondary Battery A method for manufacturing a negative electrode active material for a lithium secondary battery according to an embodiment of the present invention may include: manufacturing primary particles by using a carbon raw material including green coke; manufacturing secondary particles by mixing the primary particles and a binder; carbonizing the secondary particles; and manufacturing a graphite material by graphitizing the carbonized secondary particles.

First, in the manufacturing of primary particles, the green coke may include a needle coke, an isotropic coke, a pitch coke, and a combination thereof.

Accordingly, the green coke may include a needle coke, an isotropic coke, and a combination thereof. The green coke may include 4 to 10 wt % of a volatile matter for the entire 100 wt %.

In detail, when the green coke is used, the negative electrode active material for a lithium secondary battery with a low expansion rate and an excellent high-speed charging and discharging characteristic.

Further, when the green coke is used, an additional heat treatment process for removing a volatile matter is not performed like the calcined coke so price competitiveness may be excellent.

For reference, when the green coke is calcined or carbonized, the volatile matter is removed therefrom, and it undergoes a heat treatment, and it will be referred to as a "calcined coke."

In detail, the manufacturing of primary particles by using a carbon raw material including a green coke may include pulverizing and grinding the green coke.

First, in the pulverizing of the green coke, a pulverizer may use a jet-mill, a roller mill, or a series-type or a batch-type pulverizing device in a general form for simultaneously allowing air classification and pulverization. This is, however, not limited thereto.

After this, the pulverized coke may be ground.

A grinding process for reducing roughness on a surface of the pulverized green coke and exposure of a fracture surface generated when pulverized and forming into a spheroidized particle shape is performed.

The grinding may be performed at a rotation rate of 1500 to 8000 rpm/min.

In detail, the grinding process may generally function to improve packing density or tap density by increasing the sphericity of pulverized particles, and improving a grain size distribution to be further uniform by removing a fine powder region according to an additional air classification.

As a device for the grinding process, a general pulverizing device or a modified pulverizing device for improving a spheroidizing effect and allowing fine powder classification may be used. However, it is not limited thereto.

In this instance, the particle diameter D50 of the primary particles manufactured by performing the pulverizing and the grinding may be 5.5 to 10 μm. In detail, it may be 6 to 10 μm.

First, in the present specification, the particle diameter D50 represents a particle size when active material particles with various particle sizes are accumulated up to 50% of a volume ratio.

In detail, when the particle diameter of the primary particles is very small, the particle diameter of the manufactured secondary particles may be smaller than the target. Also, when the specific surface area is excessively high, an amount of binders added in the manufacturing of secondary particles may be increased. By this, a content of a graphite material originated from the binder is high so it may be difficult to realize a high-capacity negative electrode material.

In addition, when the particle diameter of the primary particles are very big, the particle diameter of the secondary particle manufactured using them may be excessively increased to reduce the tap density, so it may be difficult to form a high-density electrode. Hence, it may be difficult to realize high power at the time of charging and discharging. Electrode alignment is also increased so an electrode expansion rate at the time of charging and discharging is increased.

Therefore, the particle diameter D50 of the primary particles may be within the range.

In detail, the primary particles may be mixture of elementary particles of 5.5 to 8.0 μm and large particles that are greater than 8.0 μm and equal to or less than 10.0 μm.

In further detail, when the primary particles with different particle diameters are mixed and used, the tap density of the negative electrode active material increases to thus allow manufacturing of the high-density electrode and manufacture the high-capacity battery, which is a merit.

The sphericity of the primary particles may be 0.75 to 1.0.

In detail, when the sphericity of the primary particles is within the range, the tap density may be improved by using this when the secondary particles are manufactured. Further, by the spheroidization process, a predetermined rate of an edge side with relatively high accumulation of electrons from among the primary particles and electrochemical reactivity may be reduced. By this, generation of a passivation layer caused by decomposition of an electrolyte solution during a charging and discharging reaction may be suppressed. Particularly, excellent effects such as retardation of precipitation of a lithium metal on a surface of the graphite may be provided in the high-speed charging reaction condition.

After this, the secondary particles may be manufactured by mixing the primary particles and the binder.

In detail, the primary particles and the binder are mixed, and a shearing force is used through a hot kneading process to thereby manufacture the secondary particles.

In this instance, the binder may be a pitch.

The pitch may be a material based on a coal-based raw material such as coal tar or a petroleum-based raw material.

A softening point of the binder may be 80 to 300° C.

When the softening point is less than 80° C., the binding force is low so it is difficult to combine the primary particles and form the secondary particles, and a carbonization yield is low so it is difficult to realize an economical manufacturing process. On the other hand, when the softening point is greater than 300° C., the temperature for driving the equipment for fusion of the binder material is high, so the cost of production equipment increases, and thermal modification and carbonization of some samples according to a high-temperature use may proceed.

In the manufacturing of the secondary particles, for 100 parts by weight of the primary particles, 2 to 20 parts by weight of the binder may be included.

In detail, when added at less than 2 parts by weight, a binding effect is less so they may not be fluently made into secondary particles. Further, the binding force among the primary particles in the secondary particles is reduced so they may not be easily made into fine powder during a powder processing procedure such as pulverization.

In another way, when added at greater than 20 parts by weight, the content of the graphite material originated from the binder is relatively high so the volume of the negative electrode material may be reduced. Further, the content of pores generated by heat decomposition is high so the specific surface area is increased and battery efficiency may be reduced.

In detail, the manufacturing of secondary particles by mixing the primary particles and the binder may be performed at equal to or greater than the softening point of the binder.

In detail, the mixing for manufacturing secondary particles may be performed when the primary particles and the pitch at room temperature are input to a device for mixing them into a mixture in a high-viscosity paste form at a high temperature. In this instance, a chamber may be maintained at equal to or greater than 30° C. vs. the softening point of the pitch. By this, the pitch is sufficiently softened to have fluidity, thereby allowing a fluent and uniform mixture.

In detail, the manufacturing of secondary particles may be performed for one hour to five hours after mixing the primary particles and the pitch and reaching a predetermined temperature.

When performed for less than one hour, uniform mixing of the pitch and the primary particles may be difficult. In the case of greater than five hours, modification of the pitch (oxidation and thermal modification) progresses by excessive overheating, so the drawback that the capacity and efficiency characteristics of the graphite material produced is manifested after the heat treatment process is finished is reduced may be generated.

The particle diameter D50 of the secondary particles manufactured according to the above-noted process may be 11 to 25 μm. In detail, the particle diameter D50 of the manufactured secondary particle may be 12 to 20 μm, and in further detail, 15 to 18 μm. The secondary particles may have a shape of a powder generated by condensing the primary particles through a heating and mixing process.

In detail, when the secondary particle size D50 is less than 11 μm, the number of the primary particles provided to the secondary particles is very much less, a randomized orientation among particles on an electrode layer is insufficient, and an electrode expansion rate according to a repetition of the charging and discharging reaction may increase. Further, the specific surface area of the negative electrode powder may be increased and battery efficiency may be reduced.

On the other hand, when it is greater than 25 μm, tap density is substantially lowered, and formation of a flat electrode surface is scarcely achieved after it is rolled, and realization of appropriate electrode density is difficult to be obtained, so it is difficult to form the secondary battery electrode for expressing excellent battery performance.

However, when the particle diameter of the secondary particles is greater than 25 μm, the grain size may be adjusted by pulverizing the same by use of a pin mill. The revolutions per minute (rpm) of the pulverizer may be controlled so as to control the appropriate grain size of the condensed powder. However, it is not limited thereto, and various pulverizers may be used to achieve the target grain size.

In this instance, sphericity of the secondary particle may be 0.8 to 1.0. In detail, the sphericity of the secondary particle may be 0.9 to 1.0.

After this, the secondary particle may be carbonized.

In detail, the secondary particle may be carbonized at a non-oxidizing atmosphere and within a range of 800 to 1500° C.

The carbonizing may be performed for one to three hours.

In this instance, a temperature-raising rate up to the temperature may be 5 to 20° C./min. A structural change may be minimized by a slow temperature rise at the above-noted rate.

The volatile matter included in the primary particles may be removed by performing carbonization in the condition.

Further, after the carbonization of the secondary particle, the carbonized secondary particles may further be ground.

In detail, to reduce roughness of the surface and exposure of the fracture surface and to form into a spheroidized particle shape, the grinding process may be performed after the carbonization.

According to this, the sphericity of the secondary particles obtained after the grinding may be 0.9 to 1.0.

Therefore, the tap density of the graphite material including the secondary particles may be further excellent.

In detail, the tap density of the graphite material including the ground secondary particles may be 0.83 g/cc to 1.2 g/cc.

Finally, a graphite material may be manufactured by graphitizing the carbonized secondary particles.

In detail, the graphite material may be manufactured by graphitizing the secondary particle at 2800 to 3200° C.

In detail, it may be performed for at least one hour.

Further, to maintain a tissue in the carbonization, the temperature may be raised at a same rate.

Further, the graphitizing may be performed in an inert atmosphere. In detail, it may be performed in a nitrogen, argon, or helium gas atmosphere, but is not limited thereto.

In further detail, the graphitizing may change heat-treatment temperature conditions such as a temperature-raising rate or a maintenance time at the maximum temperature depending on shapes and characteristics of the graphitizing device in use, so it is not limited thereto.

For reference, the negative electrode active material for a lithium secondary battery according to an embodiment of the present invention is graphitized in an Acheson-type graphitizing furnace.

Further, when needed, the graphite material obtained in the graphitizing may further undergo a de-pulverizing or pulverizing process using a pin mill.

By this, the negative electrode active material for a lithium secondary battery may be finally obtained by making the graphite material into a fine powder.

Accordingly, the specific surface area of the graphite material may be 0.6 to 2.0 m²/g. In detail, the specific surface area of the graphite material may be 0.95 to 1.88 m²/g, and in further detail, 1.3 to 1.65 m²/g.

The tap density of the graphite material may be 0.8 g/cc to 1.2 g/cc. In detail, it may be 0.83 g/cc to 1.2 g/cc.

In detail, the graphite material with a low specific surface area and a high tap density may be provided.

Hence, when this is applied to the lithium secondary battery, efficiency and performance of the battery may be excellent.

A span value of the graphite material may be 1.0 to 1.32.

In detail, the span value of the graphite material may be 1.0 to 1.2.

In detail, in the present specification, the "span" value is obtained by using the equation of (D90−D10)/D50 using D10, D50, and D90 that are indexes of the particle sizes. The particle diameters D10, D50, and D90 represent particle sizes when the active material particles distributed in various particle sizes are accumulated with a volumetric ratio of up to 10%, 50%, and 90%.

Hence, when the span value of the graphite material is very small, a production yield may be substantially reduced and a cost may be increased so as to process powder with very small deviation of grain sizes in an industrial point of view. Further, a problem in which porosity between powders is relatively low so wetness of an electrolyte is reduced and ion conductivity in the electrode is reduced, and a problem in which it is difficult to configure the electrode with high tap density may be generated.

Meanwhile, when the span value is very big, the entire specific surface area caused by fine powder increases to reduce the initial charging and discharging efficiency, and viscosity of a slurry for coating the electrode substantially increases, so it may be difficult to manufacture the electrode with uniform quality.

Another embodiment of the present invention provides a lithium secondary battery including: a positive electrode; a negative electrode; and an electrolyte, wherein the negative electrode includes a negative electrode active material produced by the above-described method.

In detail, the electrolyte may further include at least one electrolyte additive selected from among fluoroethylene carbonate (FEC), vinylene carbonate (VC), ethylene sulfonate (ES), and combinations thereof.

This is because the cycle characteristic may be further improved by additionally applying an electrolyte additive such as the FEC, and a stable solid electrolyte interphase (SEI) may be formed by the electrolyte additive. This fact will be supported through examples to be described.

The characteristics of the negative electrode active material and the corresponding lithium secondary battery are identical to the above-provided description. Further, the configuration of the battery excluding the negative electrode active material is known to a person skilled in the art. Therefore, no detailed descriptions thereof will be provided.

Embodiments will now be described in detail. However, the embodiments described below are embodiments of the present invention, and the present invention is not limited to the embodiments.

Embodiment 1

1 Manufacturing Negative Electrode Active Material

As a carbon raw material, green coke (about 5.0 wt % of the content of VM) that is a coal-based premium needle coke product is used. In detail, the green coke is pulverized for the first time by using an air classifying mill so that the particle diameter D50 may be 7 μm. The pulverized particles are additionally ground by using pulverizing equipment in a pulverizer type to which an air classifying device is attached, and the particle diameter D50 of the obtained primary particles is about 7.5 μm.

5 parts by weight of the pitch with the softening point of 120° C. is mixed to the obtained 100 parts by weight of the primary particles. They are mixed with each other for two hours by use of a mixer that may apply heat to manufacture the secondary particles. In this instance, the particle diameter D50 of the secondary particles is 15.1 μm.

Carbonization is performed for one hour in a nitrogen atmosphere at 1200° C., the temperature is increased to 3000° C., and they are graphitized for one hour to thus manufacture the negative electrode active material.

2 Manufacturing Lithium Secondary Battery

A negative electrode active material slurry is manufactured by mixing 97 wt % of the negative electrode active material manufactured in (1), 2 wt % of the binder including carboxymethyl cellulose and styrene butadiene rubber, and 1 wt % of a super P conductive material in a distilled water solvent.

The negative electrode active material slurry is applied to a current collector of copper (Cu), it is dried for ten minutes at 100° C., and it is compressed by a roll press. It is vacuum-dried for twelve hours in a vacuum oven at 100° C. to produce a negative electrode. The electrode density of the negative electrode after the vacuum-dry is set to be 1.6 g/cc.

Lithium metal (Li-metal) is used as an opponent electrode, and a solution in which a 1 mol solution of $LiPF_6$ is dissolved into a mixed solvent with a volume ratio of ethylene carbonate (EC) to dimethyl carbonate (DMC) of 1:1 is used as an electrolyte solution.

The respective constituent elements are used, and a CR 2032 half coin cell is produced according to a conventional manufacturing method.

Embodiment 2

1 Manufacturing Negative Electrode Active Material

In comparison to (1) of the embodiment 1, the negative electrode active material is manufactured according to a same method except that the particle diameter D50 of the primary particles is set to be 6 μm, and 10 parts by weight of the pitch is mixed to 100 parts by weight of the primary particles.

2 Manufacturing Lithium Secondary Battery

The lithium secondary battery is manufactured by the same method as (2) of the embodiment 1 by using the negative electrode active material of (1).

Embodiment 3

1 Manufacturing Negative Electrode Active Material

In comparison to (1) of the embodiment 1, the negative electrode active material is manufactured according to a same method except that the grinding process is additionally performed after the secondary particles are manufactured.

2 Manufacturing Lithium Secondary Battery

The lithium secondary battery is manufactured according to the same method of (2) of the embodiment 1 by using the negative electrode active material of (1).

Embodiment 4

1 Manufacturing Negative Electrode Active Material

In comparison to (1) of the embodiment 1, the negative electrode active material is manufactured according to a same method except that the particle diameter D50 of the primary particles is set to be 6 μm, and the grinding process is additionally performed after the secondary particles are manufactured.

2 Manufacturing Lithium Secondary Battery

The lithium secondary battery is manufactured according to the same method as (2) of the embodiment 1 by using the negative electrode active material of (1).

Embodiment 5

1 Manufacturing Negative Electrode Active Material

In comparison to (1) of the embodiment 1, the negative electrode active material is manufactured according to a same method except that the particle diameter D50 of the primary particles is 9 μm.

2 Manufacturing Lithium Secondary Battery

The lithium secondary battery is manufactured according to the same method as (2) of the embodiment 1 by using the negative electrode active material of (1).

Embodiment 6

1 Manufacturing Negative Electrode Active Material

In comparison to (1) of the embodiment 4, the negative electrode active material is manufactured according to a same method except that the grinding process is additionally performed after the secondary particles are manufactured.

2 Manufacturing Lithium Secondary Battery

The lithium secondary battery is manufactured according to the same method as (2) of the embodiment 1 by using the negative electrode active material of (1).

Embodiment 7

1 Manufacturing Negative Electrode Active Material

In comparison to (1) of the embodiment 1, the negative electrode active material is manufactured according to the same method except that the primary particles with the particle diameters D50 of 6 μm and 9 μm are mixed with the weight ratio of 1:1.

2 Manufacturing Lithium Secondary Battery

The lithium secondary battery is manufactured according to the same method as (2) of the embodiment 1 by using the negative electrode active material of (1).

Embodiment 8

1 Manufacturing Negative Electrode Active Material

In comparison to (1) of the embodiment 7, the negative electrode active material is manufactured according to the same method except that the grinding process is additionally performed after the secondary particles are manufactured.

2 Manufacturing Lithium Secondary Battery

The lithium secondary battery is manufactured according to the same method as (2) of the embodiment 1 by using the negative electrode active material of (1).

Embodiment 9

1 Manufacturing Negative Electrode Active Material

In comparison to (1) of the embodiment 4, the negative electrode active material is manufactured according to a same method except that 50% of isotropic coke is added as a carbon raw material.

2 Manufacturing Lithium Secondary Battery

The lithium secondary battery is manufactured according to the same method as (2) of the embodiment 1 by using the negative electrode active material of (1).

Comparative Example 1

1 Manufacturing Negative Electrode Active Material

In comparison to (1) of the embodiment 1, the negative electrode active material is manufactured according to the same method except that the process for manufacturing secondary particles is omitted.

2 Manufacturing Lithium Secondary Battery

The lithium secondary battery is manufactured according to the same method as (2) of the embodiment 1 by using the negative electrode active material of (1).

Comparative Example 2

1 Manufacturing Negative Electrode Active Material

In comparison to (1) of the embodiment 1, the negative electrode active material is manufactured according to a same method except that 50 wt % of calcined coke is added as a carbon raw material.

2 Manufacturing Lithium Secondary Battery

The lithium secondary battery is manufactured according to the same method as (2) of the embodiment 1 by using the negative electrode active material of (1).

Comparative Example 3

1 Manufacturing Negative Electrode Active Material

In comparison to (1) of the embodiment 1, the negative electrode active material is manufactured according to the same method except that the particle diameter D50 of the primary particles is 4.5 μm.

2 Manufacturing Lithium Secondary Battery

The lithium secondary battery is manufactured according to the same method as (2) of the embodiment 1 by using the negative electrode active material of (1).

Comparative Example 4

1 Manufacturing Negative Electrode Active Material

In comparison to (1) of the embodiment 1, the negative electrode active material is manufactured according to the same method except that the calcined coke is used as a carbon raw material.

2 Manufacturing Lithium Secondary Battery

The lithium secondary battery is manufactured according to the same method as (2) of the embodiment 1 by using the negative electrode active material of (1).

Comparative Example 5

1 Manufacturing Negative Electrode Active Material

In comparison to (1) of the embodiment 1, the negative electrode active material is manufactured according to a same method except that the particle diameter D50 of the primary particles is 11.0 μm.

2 Manufacturing Lithium Secondary Battery

The lithium secondary battery is manufactured according to the same method as (2) of the embodiment 1 by using the negative electrode active material of (1).

Table 1 expresses a summary of carbon raw materials according to embodiments and comparative examples, a particle diameter D50 of primary particles, and performance of grinding.

TABLE 1

| | Carbon raw material | Particle diameter D50 of primary particles (μm) | Performance of grinding |
|---|---|---|---|
| Embodiment 1 | Green (needle) coke | 7.5 | After primary particles |
| Embodiment 2 | Green (needle) coke | 6.0 | After primary particles |
| Embodiment 3 | Green (needle) coke | 7.5 | After primary and secondary particles |
| Embodiment 4 | Green (needle) coke | 6.0 | After primary and secondary particles |
| Embodiment 5 | Green (needle) coke | 9.0 | After primary particles |
| Embodiment 6 | Green (needle) coke | 9.0 | After primary and secondary particles |
| Embodiment 7 | Green (needle) coke | 6 μm:9 μm = 1:1 | After primary particles |
| Embodiment 8 | Green (needle) coke | 6 μm:9 μm = 1:1 | After primary and secondary particles |
| Embodiment 9 | Green coke (needle + isotropic) | 7.5 | After primary particles |
| Comparative Example 1 | Green (needle) coke | 7.5 | After primary particles (No manufacturing of secondary particles) |
| Comparative Example 2 | Needle + calcined | 7.5 | After primary particles |
| Comparative Example 3 | Green (needle) coke | 4.5 | After primary particles |
| Comparative Example 4 | calcined coke | 7.5 | After primary particles |
| Comparative Example 5 | Green (needle) coke | 11.0 | After primary particles |

An experimental example using the embodiment and the comparative example will now be described.

Experimental Example 1: Measuring Characteristic of Lithium Secondary Battery (Half-Cell)

A lithium secondary battery is manufactured by using the negative electrode active material produced according to the embodiment and the comparative example. A specific surface area (BET), tap density, sphericity, a particle diameter D50 of secondary particles, and a span of the lithium secondary battery are measured and are expressed in Table 1.

15

Method for Measuring Tap Density

With reference to ASTM-B527, 10 g of powder is put into a 50 mL container, it is tapped at 3000 cycles @ 284 cycle/min, and filling density is measured.

Method for Measuring Specific Surface Area

The specific surface area is measured by using a BET method (Surface area and Porosity analyzer) (Micromeritics, ASAP2020).

Method for Measuring Sphericity

The sphericity is measured by using an analyzer for obtaining optical images (Fluid Imaging Technologies, Flowcam 8100) and an analysis S/W (visual spreadsheet).

The meanings of the particle diameter D50 and the span have already been described, so no detailed descriptions thereof will be provided.

TABLE 2

| | Specific surface area (m$^2$/g) | Tap density (g/cc) | Average sphericity of secondary particles | Particle diameter D50 of secondary particles (μm) | Span ((D90-D10)/D50) |
|---|---|---|---|---|---|
| Embodiment 1 | 1.45 | 0.94 | 0.88 | 15.1 | 1.22 |
| Embodiment 2 | 1.62 | 0.82 | 0.93 | 11.4 | 1.25 |
| Embodiment 3 | 1.15 | 1.05 | 0.94 | 16.2 | 1.09 |
| Embodiment 4 | 1.54 | 0.85 | 0.95 | 12.7 | 1.13 |
| Embodiment 5 | 1.3 | 0.91 | 0.82 | 19.5 | 1.21 |
| Embodiment 6 | 0.95 | 0.92 | 0.9 | 21.2 | 1.12 |
| Embodiment 7 | 1.88 | 1.01 | 0.87 | 16.3 | 1.29 |
| Embodiment 8 | 1.67 | 1.1 | 0.92 | 17.5 | 1.19 |
| Embodiment 9 | 1.65 | 0.89 | 0.81 | 16.2 | 1.31 |
| Comparative Example 1 | 2.2 | 1.1 | 0.9 | 8.9 | 1.33 |
| Comparative Example 2 | 1.8 | 0.89 | 0.76 | 16.5 | 1.39 |
| Comparative Example 3 | 3.25 | 0.69 | 0.95 | 9.2 | 1.02 |
| Comparative Example 4 | 2.11 | 0.83 | 0.89 | 18.6 | 1.39 |
| Comparative Example 5 | 0.98 | 0.88 | 0.77 | 23.4 | 1.41 |

It is found that the negative electrode active material generated through a grinding process after the secondary particles are obtained in a like manner of the embodiment 3, the embodiment 4, the embodiment 6, and the embodiment 8 has sphericity of secondary particles and tap density that are generally increased, compared to the case of the embodiment in which no additional grinding process is performed after the secondary particles are obtained. It is found that a particle diameter distributing section span and the specific surface area are reduced.

Further, it is found that as the particle diameter of the primary particles increases, the specific surface area of the manufactured negative electrode active material is generally reduced, and the particle diameter of the negative electrode active material that are made into secondary particles increases in proportion.

As the tap density of the negative electrode active material becomes higher, the electrode layer may be expected to have high density and the energy density may be expected to increase. Hence, it is found according to results expressed in Table 2 that the negative electrode active material according to an embodiment may be well used in manufacturing a high-capacity negative electrode active material.

It is found that the particle diameter D50 of the secondary particles fail to reach a targeting level except that the particle diameter of the green coke is small in a like manner of the comparative example 3 when manufactured with the same conditions as the embodiment 1. In addition, the comparative example 3 has a higher specific surface area and a lower tap density than the embodiment.

Further, it is found in the case of the negative electrode material manufactured by using the calcined coke like the comparative example 4, that the specific surface area is higher than that of the embodiment.

Experimental Example 2: Measuring Initial Discharging Capacity and Efficiency of Lithium Secondary Battery (Half-Cell)

In the above, tests were performed by applying the finally obtained active material to the half-cell in the embodiments and the comparative examples.

In detail, the battery is driven in the 0.1 C, 5 mV, 0.00 5 C cut-off charging, and 0.1 C, 1.5 V cut-off discharging condition, and initial discharging capacity and initial efficiency values are recorded in Table 3.

TABLE 3

| | Discharging capacity (mAh/g) | Efficiency (%) |
|---|---|---|
| Embodiment 1 | 354 | 92.4 |
| Embodiment 2 | 353 | 91.5 |
| Embodiment 3 | 354 | 93.1 |
| Embodiment 4 | 353 | 92.3 |
| Embodiment 5 | 354 | 93.1 |
| Embodiment 6 | 353 | 93.5 |
| Embodiment 7 | 354 | 92.9 |
| Embodiment 8 | 354 | 93.2 |
| Embodiment 9 | 341.7 | 90.2 |
| Comparative Example 1 | 355 | 92.0 |
| Comparative Example 2 | 354 | 93.2 |
| Comparative Example 3 | 349.2 | 89.1 |
| Comparative Example 4 | 353 | 92.5 |
| Comparative Example 5 | 353 | 93.0 |

Referring to Table 3, the initial efficiency of the negative electrode material (embodiments 3, 4, 6, and 8) having additionally undergone the grinding process after obtaining the secondary particles by using the green coke as a raw material in a like way of the embodiment 3 is better than the case of omitting the grinding process after obtaining the secondary particles.

Further, it is found as in the embodiment 2 and the embodiment 4 that the efficiency of the battery in the case of the embodiment 2 in which the size of the primary particles is smaller is reduced compared to the embodiment 4. This is because the specific surface area of the negative electrode active material is relatively high and the passivated film is more actively formed.

The embodiment 9 shows a mixture of 50 wt % of the needle coke and 50 wt % of the isotropic coke with respect to 100 wt % of the green coke. As a result, it is found that, as the isotropic coke is mixed, capacity and efficiency are slightly lower than another embodiment.

Particularly, it is found in the case of the comparative example 3 in which the primary particles have the smallest size that the initial efficiency is the lowest. It is found from this that, regarding the secondary battery according to a comparative example 3, a side reaction on the electrode surface is the most active at the initial charging and discharging.

Experimental Example 3: Measuring High-Speed
Discharging and Charging Characteristic of Lithium
Secondary Battery (Half-Cell)

The active materials finally obtained in the embodiments
and the comparative examples are applied to the half-cell
and are tested.

The high-speed discharging characteristic represents relative values by measuring battery capacity in the 3 C and 0.2 C conditions. Regarding the high-speed charging characteristic, the initial discharging capacity is determined in the 0.1 C, 5 mV, 0.005 C cut-off charging and 0.1 C 1.5 V cut-off discharging condition, the charging rate (C-rate) is changed in order of the condition of 0.1 C, 0.2 C, 0.5 C, 1.0 C, and 2.0 C to repeat the charging and discharging cycle for three times, respectively, and the battery charging capacity is measured in the condition of 2 C and 0.1 C and relative values are shown.

The results are expressed in Table 4.

TABLE 4

|  | High-speed discharging characteristic (%) | High-speed charging characteristic (%) |
| --- | --- | --- |
| Embodiment 1 | 91 | 41.3 |
| Embodiment 2 | 94 | 44.8 |
| Embodiment 3 | 93 | 43.7 |
| Embodiment 4 | 95 | 47.1 |
| Embodiment 5 | 90 | 36.5 |
| Embodiment 6 | 93 | 38.2 |
| Embodiment 7 | 92 | 40.2 |
| Embodiment 8 | 94 | 43.2 |
| Embodiment 9 | 96 | 46.6 |
| Comparative Example 1 | 75 | 31.7 |
| Comparative Example 2 | 88 | 37.5 |
| Comparative Example 3 | 98 | 49.8 |
| Comparative Example 4 | 82 | 32.7 |
| Comparative Example 5 | 86 | 35.6 |

Referring to Table 4, it is found that the smaller the size of the pulverized primary particles and the size of the secondary particles are, the better the high-speed discharging characteristic and charging characteristic are.

Particularly, it is found in the case of the comparative example 5 in which the particle diameter D50 of the primary particles is 11.0 μm that the high-speed charging and discharging characteristic is deteriorated.

Further, the high-speed discharging and charging characteristic of the case in which the grinding process is additionally performed after the secondary particles are obtained (embodiments 3, 4, 6, and 8) is more excellent than the case in which the grinding process is omitted after the secondary particles are obtained.

In another way, when the isotropic coke from among raw coke is mixed as shown with reference to embodiment 9, capacity of the negative electrode material is slightly reduced as expressed in Table 3. However, as expressed in Table 4, the high-speed discharging and charging characteristic is better than the case of using the needle coke. This is because the size of the graphite crystal originated from the isotropic coke is relatively smaller than the size of the crystal originated from the needle coke, a spreading path of lithium ions at the time of charging and discharging is short, and resistance is small.

The case of the negative electrode material that is not made into secondary particles like in the comparative example 1 has a merit in which discharging capacity is slightly high as expressed in Table 3. As expressed in Table 4, it is found that the high-speed discharging and charging characteristic is very deteriorated. This is because the randomized orientation degree among the particles in the electrode structure is low and it has a disadvantageous characteristic in reversible diffusion of lithium ions.

When the calcined coke is mixed to the carbon raw material of the green coke as shown in the comparative example 2, it is found that the high-speed charging and discharging characteristic is slightly reduced compared to the negative electrode material manufactured by using the green coke. This is because the sphericity of the secondary particles is relatively lower than the negative electrode material originated from the green coke, and the randomized orientation degree in the electrode structure is low, so the diffusion rate of the lithium ions is reduced according to a similar reason to the comparative example 1.

Further, it is found that the high-speed charging and discharging characteristic is excellent when the particle diameter of the primary particles is excessively small as expressed in the comparative example 3, but as found in Tables 2 and 3, the specific surface area is excessively high, the initial efficiency is low, so competitiveness as a battery material is significantly lowered.

An embodiment according to the present invention will now be described with reference to accompanying drawings.

FIG. 1 shows a flowchart of a method for manufacturing a negative electrode active material for a lithium secondary battery according to an embodiment of the present invention.

Figure 2:
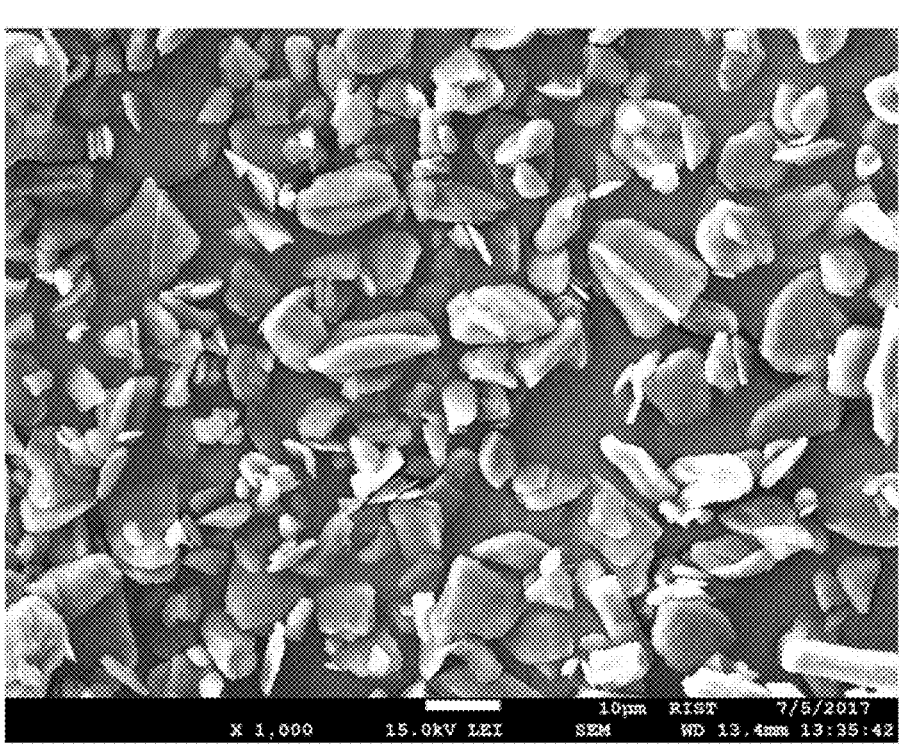
FIG. 2 shows primary particles according to an embodiment 1 observed with a SEM.

FIG. 2 shows primary particles according to an embodiment 1 observed with a SEM.

Figure 3:
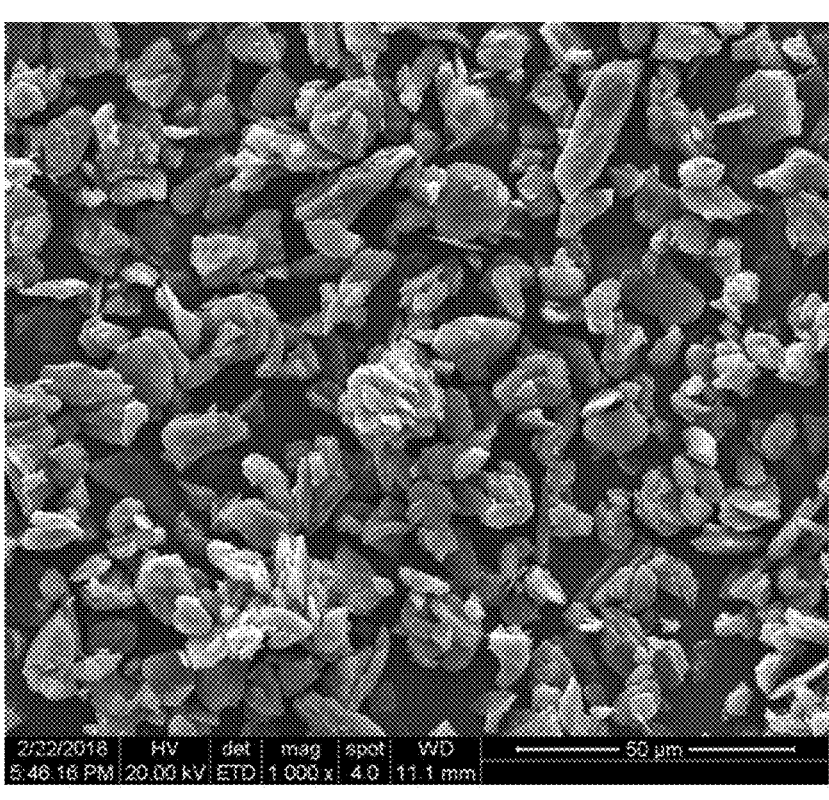
FIG. 3 shows a negative electrode active material according to an embodiment 1 observed with a SEM of 1000 magnification.

FIG. 3 shows a negative electrode active material according to an embodiment 1 observed with a SEM.

Figure 4:
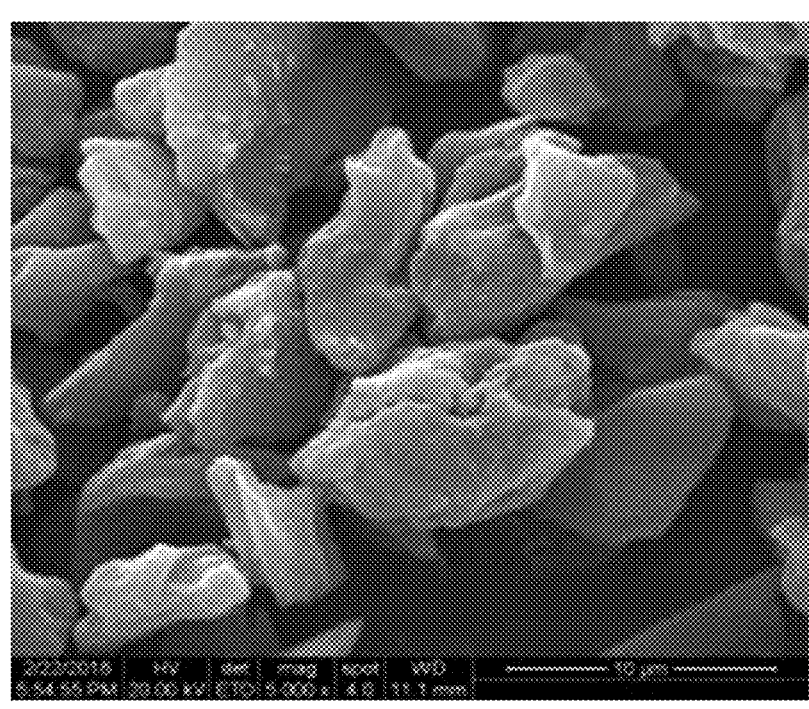
FIG. 4 shows a negative electrode active material according to an embodiment 1 observed with a SEM of 5000 magnification.

FIG. 4 shows a negative electrode active material according to an embodiment 1 observed with a SEM.

Figure 5:
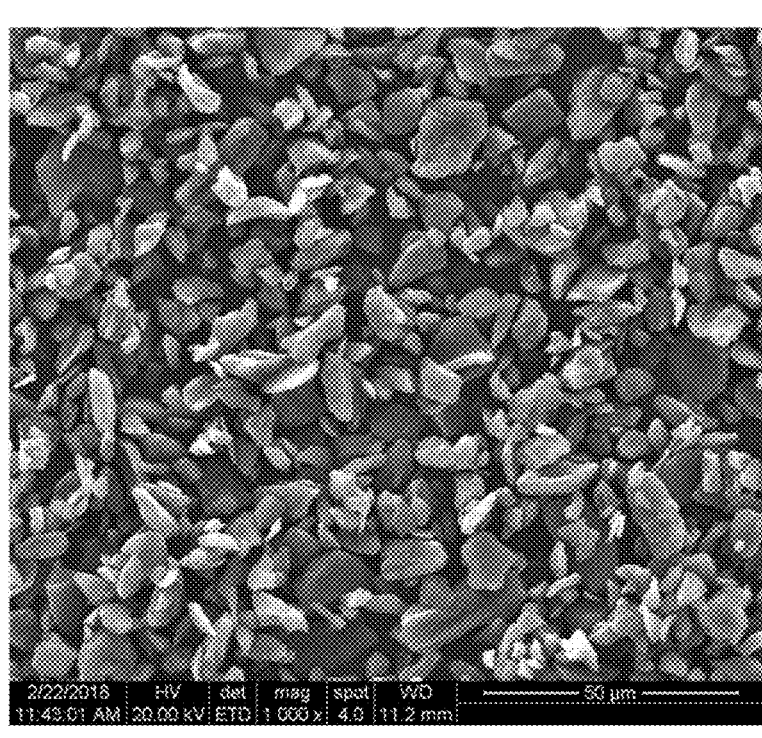
FIG. 5 shows a negative electrode active material according to an embodiment 3 observed with a SEM of 1000 magnification.

FIG. 5 shows a negative electrode active material according to an embodiment 3 observed with a SEM of 1000 magnification.

Figure 6:
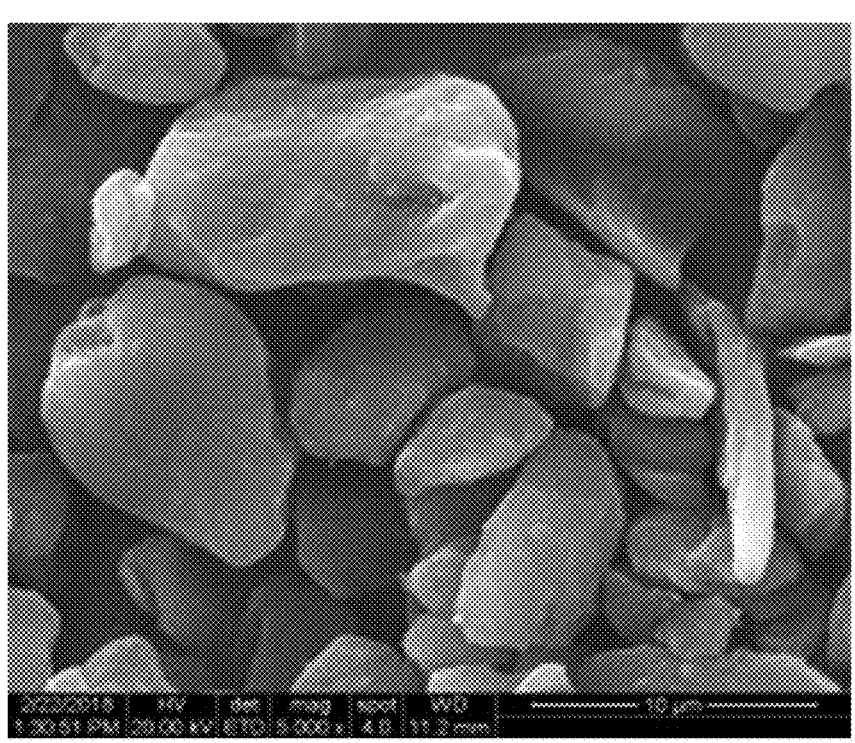
FIG. 6 shows a negative electrode active material according to an embodiment 3 observed with a SEM of 5000 magnification.

FIG. 6 shows a negative electrode active material according to an embodiment 3 observed with a SEM of 5000 magnification.

As shown in FIGS. 3 to 6, it is found, compared to the embodiment 1, that the particles according to an embodiment 3 have a broken particle side in a shape that is not sharp but similar to a relatively gentle oval. That is, it is found, compared to the particles that are not additionally ground in a like manner of the embodiment 1, that the roughness of the ground particles according to an embodiment 3 is further reduced.

The present invention is not limited to the embodiments, but may be implemented in various different forms. It may be understood by those skilled in the art to which the present invention pertains that the present invention may be implemented in other specific forms without changing the spirit or essential features thereof.

Therefore, it should be understood that the aforementioned embodiments are illustrative in terms of all aspects and are not limited. The range of the present invention is provided in the claims to be described rather than the above-described detailed description, and all modifications or modified forms drawn from the meanings, range, and equivalent concepts of the claims of the patent have to be interpreted to be included in the range of the present invention.

What is claimed is:

1. A negative electrode active material for a lithium second battery, comprising a graphite material including secondary particles, wherein the secondary particles are an assembly of a plurality of primary particles, the primary particles include carbon raw material derived from green coke, and a ratio ((D90–D10)/D50) of a difference between a particle diameter D90 and a particle diameter D10 with respect to a particle diameter D50 of the secondary particles is 1.09 to 1.21, wherein a specific surface area (BET) of the graphite material is 0.95 to 1.67 $m^2/g$, wherein a particle diameter D50 of the primary particles is 6.0 to 9.0 μm.

2. The negative electrode active material for a lithium secondary battery of claim 1, wherein a span value that is the ratio ((D90–D10)/D50) of a difference between a particle diameter D90 and a particle diameter D10 with respect to a particle diameter D50 of the secondary particles is 1.0 to 1.2.

3. The negative electrode active material for a lithium secondary battery of claim 2, wherein sphericity of the secondary particles is 0.8 to 1.0.

4. The negative electrode active material for a lithium secondary battery of claim 3, wherein the particle diameter D50 of the secondary particles is 11 to 25 μm.

5. The negative electrode active material for a lithium secondary battery of claim 1, wherein tap density of the graphite material 0.8 g/cc to 1.2 g/cc.

6. The negative electrode active material for a lithium secondary battery of claim 5, wherein the graphite material satisfies Equation 1:

$$\text{Specific surface area } [m^2/g]/\text{tap density } [g/cc] < 2. \qquad \text{[Equation 1]}$$

7. A lithium secondary battery comprising:

a positive electrode;

a negative electrode including a negative electrode active material for a lithium secondary battery of claim 1; and an electrolyte.

\* \* \* \* \*